`US010847147B2`

United States Patent
Gurunath Kulkarni et al.

(10) Patent No.: US 10,847,147 B2
(45) Date of Patent: *Nov. 24, 2020

(54) HYPERARTICULATION DETECTION IN REPETITIVE VOICE QUERIES USING PAIRWISE COMPARISON FOR IMPROVED SPEECH RECOGNITION

(71) Applicant: Microsoft Technology Licensing, LLC, Redmond, WA (US)

(72) Inventors: Ranjitha Gurunath Kulkarni, Sunnyvale, CA (US); Ahmed Moustafa El Kholy, Bellevue, WA (US); Ziad Al Bawab, San Jose, CA (US); Noha Alon, Sunnyvale, CA (US); Imed Zitouni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,871

(22) Filed: May 24, 2019

(65) Prior Publication Data
US 2019/0279612 A1    Sep. 12, 2019

Related U.S. Application Data

(63) Continuation of application No. 15/624,451, filed on Jun. 15, 2017, now Pat. No. 10,354,642.

(Continued)

(51) Int. Cl.
*G10L 15/20* (2006.01)
*G10L 25/51* (2013.01)
(Continued)

(52) U.S. Cl.
CPC ............. *G10L 15/20* (2013.01); *G10L 15/02* (2013.01); *G10L 15/065* (2013.01); *G10L 15/22* (2013.01); *G10L 25/51* (2013.01)

(58) Field of Classification Search
CPC ......... G10L 15/22; G10L 17/06; G10L 17/04; G10L 15/10; G10L 15/26; G10L 17/00;
(Continued)

(56) References Cited

U.S. PATENT DOCUMENTS

| 2007/0225980 A1* | 9/2007 | Sumita | G10L 15/1815 |
| | | | 704/240 |
| 2008/0019496 A1* | 1/2008 | Taschereau | G06Q 30/02 |
| | | | 379/218.01 |

OTHER PUBLICATIONS

Kulkarni et al.: "Hyperarticulation Detection in Repetitive Voice Queries Using Pairwise Comparison for Improved Speech Recognition", IEEE, 2017.*

* cited by examiner

*Primary Examiner* — Huyen X Vo
(74) *Attorney, Agent, or Firm* — Alleman Hall Creasman & Tuttle LLP

(57) ABSTRACT

Automatic speech recognition systems can benefit from cues in user voice such as hyperarticulation. Traditional approaches typically attempt to define and detect an absolute state of hyperarticulation, which is very difficult, especially on short voice queries. This disclosure provides for an approach for hyperarticulation detection using pair-wise comparisons and on a real-world speech recognition system. The disclosed approach uses delta features extracted from a pair of repetitive user utterances. The improvements provided by the disclosed systems and methods include improvements in word error rate by using hyperarticulation information as a feature in a second pass N-best hypotheses rescoring setup.

20 Claims, 9 Drawing Sheets

Related U.S. Application Data

(60) Provisional application No. 62/467,002, filed on Mar. 3, 2017.

(51) Int. Cl.
    *G10L 15/02*       (2006.01)
    *G10L 15/065*     (2013.01)
    *G10L 15/22*       (2006.01)

(58) Field of Classification Search
CPC . G10L 2015/0631; G10L 15/07; G10L 15/32; G10L 17/005; G10L 15/30; G10L 2015/0636; G10L 15/065; G10L 17/22; G10L 17/24; G10L 2021/0135; G10L 25/12; G10L 25/24; G10L 15/063; G10L 2015/088; G10L 2015/225; G10L 2019/0014; G10L 15/02; G10L 2015/025; G10L 25/48; G10L 15/12; G10L 15/14; G10L 15/142; G10L 15/187; G10L 17/26; G10L 25/00; G10L 25/66; G10L 25/18
See application file for complete search history.

HYPERARTICULATION DETECTION IN REPETITIVE VOICE QUERIES USING PAIRWISE COMPARISON FOR IMPROVED SPEECH RECOGNITION

CROSS-REFERENCE TO RELATED APPLICATIONS

This application is a continuation of, and claims the benefit of priority to, U.S. patent application Ser. No. 15/624,451, titled "HYPERARTICULATION DETECTION IN REPETITIVE VOICE QUERIES USING PAIRWISE COMPARISON FOR IMPROVED SPEECH RECOGNITION" and filed Jun. 15, 2017, which claims the benefit of priority to U.S. Pat. App. No. 62/467,002, filed Mar. 3, 2017 and titled "HYPERARTICULATION DETECTION IN REPETITIVE VOICE QUERIES USING PAIRWISE COMPARISON FOR IMPROVED SPEECH RECOGNITION," the disclosures of which are hereby incorporated by reference in their entirety.

TECHNICAL FIELD

Example embodiments of the present application generally relate to audio signal processing and, in particular, to detecting hyperarticulation is present in repetitive voice queries using pairwise comparison for improved speech recognition.

BACKGROUND

There have been advances on hyperarticulation detection in the field of audio signal processing. In general, hyperarticulation is an occurrence where a speaker emphasizes particular syllables, words, and/or phrases in a spoken sentence. Hyperarticulation can indicate frustration with a particular activity or it can be a means in assisting a listener for discerning the syllables, words, and/or phrases in the spoken sentence.

With the increase in the number of applications for automatic speech recognition (ASR), understanding meta-information in a speaker's voice, rather than just the spoken words, is important. Generally, meta-information may include the volume at which the speaker is speaking, the cadence of the spoken words, the emphasis (e.g., hyperarticulation) on particular words and/or phrases, changes in pitch, the prosody of the speech, and other such meta-information.

A typical application of ASR is a voice-enabled personal assistant. A voice-enabled personal assistant may be software-implemented and configured to execute within the context of an operating system. A voice-enabled personal assistant can perform a variety of tasks relating to applications within the operating system or of relating to the operating system itself, such as web-search, command and control, navigation, and other such tasks. In addition, a voice-enabled personal assistant may be implemented on different types of devices, from mobile phones to desktop computers.

In using a voice-enabled personal assistant, a user may exhibit the behavior of query reformulation. When users are not satisfied with the results shown by the personal assistants, they tend to repeat or paraphrase their queries in order to get better results. There could be multiple reasons leading to the reformulation. When a user reformulates the query, he or she may engage in hyperarticulation of one or more words and/or phrases from the initial query. Hyperarticulation detection is a challenging task because a user's normal speaking style is not generally known before he or she presents the initial query; thus, not knowing the user's normal speaking style makes it difficult to distinguish between the user's normal speaking style and the hyperarticulation by the user.

BRIEF DESCRIPTION OF THE DRAWINGS

Various ones of the appended drawings merely illustrate example embodiments of the inventive concepts presented herein, and cannot be considered as limiting its scope.

DETAILED DESCRIPTION

Figure 1:
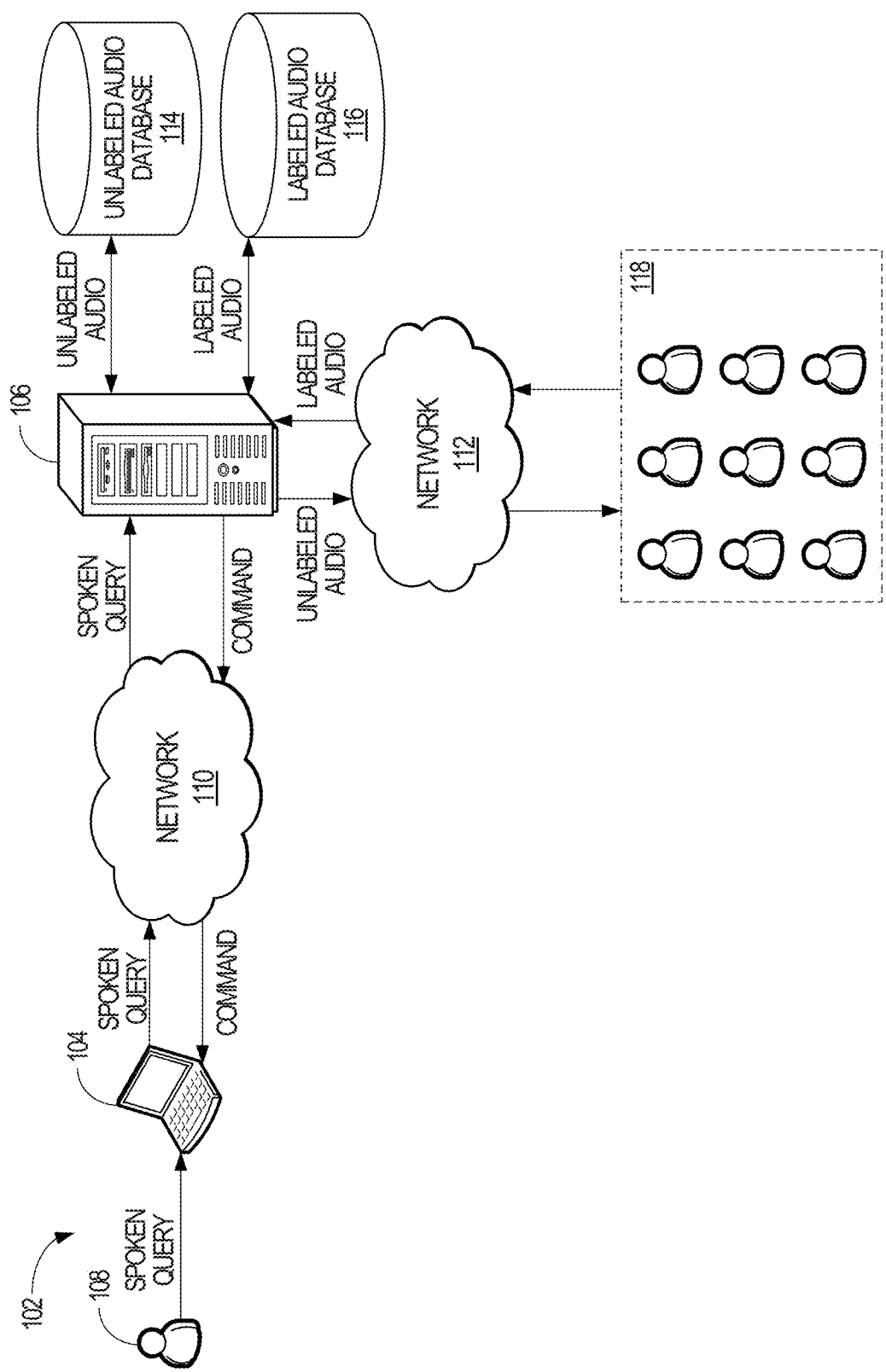
FIG. 1 is an architecture diagram illustrating a system for performing hyperarticulation detection, according to an example embodiment, having a client-server architecture configured for exchanging data over a network.

Aspects of the present disclosure involve systems and methods for detecting hyperarticulation in repetitive voice queries using pairwise comparison. Current approaches to this problem classify a single utterance irrespective of any previous queries, which leads to poor classification performance. The disclosed systems and methods address the problem of hyperarticulation detection by focusing on a pair of user voice queries that are spoken consecutively within a predetermined time frame and have a determined lexical overlap.

The pairwise comparisons of the user's voice queries has a number of technical benefits. In a first instance, the pairwise comparisons assist in collecting reference labels for training purposes. It is easier for a human judge to do comparative labeling as opposed to giving absolute labels on a subjective question. The pairwise comparisons also help in creating a non-speaker-specific model since every user has his or her own way of emphasizing or articulating speech. As users can employ different approaches to speech, having a non-speaker-specific model is technically beneficial as it allows the disclosed systems and methods to treat each users' speech queries in a similar manner.

In various embodiments, the disclosed systems and methods extract comparative features from two repetitive voice queries that help identify changes in articulation in the user's voice. Prior studies on the changes in the acoustic signal of repeated speech in human-computer interaction have been performed. These studies show that there are changes in frequencies, duration and loudness. Some of the previous work performed in speech recognition collects data by artificially simulating speech recognition errors and asking the users to repeat their utterances until they get it right. These studies show that there were significantly higher chances of clear-speech adaptations when the system made errors.

In one embodiment, this disclosure provides for a system that includes a computer-readable medium storing computer-executable instructions, and one or more hardware processors that, having executed the computer-executable instructions, configure the system to perform a plurality of operations comprising receiving a first audio phrase comprising at least one word, receiving a second audio phrase comprising at least one word, extracting a first plurality of audio features from the first audio phrase, and extracting a second plurality of audio features from the second audio phrase. The plurality of operations also include receiving a plurality of hypotheses corresponding to the second audio phrase and a first plurality of ranks, each rank being associated with a corresponding hypothesis, comparing the first plurality of audio features and the second plurality of audio features to determine whether the second audio phrase is hyperarticulated, based on a determination that the second audio phrase is hyperarticulated, re-rank the received plurality of hypotheses to determine a second plurality of ranks, and select a hypothesis from the plurality of hypotheses where the rank selected from the first plurality of ranks is different that the rank selected from the second plurality of ranks.

The embodiments disclosed herein attempt to predict hyperarticulation accurately and use it to improve a user's experience with a speech recognition systems. The methodology of this approach includes working and analyzing with real data where users are interacting with a real speech recognition system. The embodiments disclosed herein use detailed features with pairwise comparison of aligned word-segments between two utterances by the same user. While some prior efforts exist in speech recognition, this disclosure relates to the problem of hyperarticulation detection in the context of real user sessions and utterance reformulation.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is an architecture diagram 102 illustrating a client device 104 in communication with an hyperarticulation detection server 106 in accordance with an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the client device 104 and/or the hyperarticulation detection server 106 to facilitate additional functionality that is not specifically described herein.

While the client device 104 and the hyperarticulation detection server 106 are arranged as a client-server architecture, the disclosed subject matter is, of course, not limited to such an architecture, and could equally well find application in other architectures, such as an event-driven, distributed, or peer-to-peer architecture system. Further, the various functional components of the hyperarticulation detection server 106 may be implemented as standalone systems or software programs, which do not necessarily have networking capabilities. Moreover, it shall be appreciated that although the various functional components of the hyperarticulation detection server 106 are discussed in the singular sense, multiple instances of one or more of the various functional components may be employed.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic system, or any other communication device that a user 108 may use. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

The client device 104 may include one or more applications (also referred to as "apps") such as, but not limited to, an operating system, a web browser, a messaging application, an electronic mail (email) application, and software-implemented personal digital assistant configured to provide responses to various queries and/or commands. The personal digital assistant may be further configured to interact with the various applications being executed by the client device 104. The personal digital assistant is also configured to receive one or more queries and/or commands from the user 108, and to perform one or more actions in response to the received one or more queries and/or commands. For example, the personal digital assistant may display a message that the received one or more queries and/or commands was not understood or output a similar audio message. The user 108 may provide the query and/or command via text using a hardware- or software-based keyboard, via speech using a microphone or other suitable audio input device, or a combination thereof. Where the query and/or command is verbal, the personal digital assistant is further configured to communicate the verbal query and/or command to the hyperarticulation detection server 106 to determine whether the verbal query and/or command is hyperarticulated and, if so, to provide responses to the query and/or command that are based on the hyperarticulation. The personal digital assistant may also be configured to perform an action based on whether the provided query and/or command was understood. In this regard, where the personal digital assistant does not understand the provided query and/or command, the personal digital assistant may output a message that the provided query and/or command was not understood. For example, where the query and/or command is verbally communicated, the personal digital assistant may display such message as a text on a display of the client device 104.

In one embodiment, the client device 104 communicates with the hyperarticulation detection server 106 via a network 110. The network 110 may include an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The hyperarticulation detection server 106 is configured to receive one or more user queries and/or commands, along with metadata information relating to the provided user queries and/or commands, and to provide one or more hypotheses that represent the provided one or more user queries and/or commands. The hyperarticulation detection server 106 is also configured to determine whether the user 108 is using hyperarticulation in the providing the one or more user queries and/or commands, and to select a response according to whether hyperarticulation is detected.

In one embodiment, the hyperarticulation detection server 106 and the client device 104 communicate via an application programming interface (API) that provides functions and services for the client device 104 to send personal digital assistant data (e.g., voice data) to the hyperarticulation detection server 106. In addition, the client device 104 may configured with a local and/or dedicated API that instructs it to register to receive specific user query or command events.

Although the client device 104 and the hyperarticulation detection server 106 are illustrated as being separate entities in FIG. 1, the hyperarticulation detection server 106 may be instantiated on the client device 104 (or vice versa). Where the hyperarticulation detection server 106 is instantiated as a background service on the client device 104, the hyperarticulation detection server 106 registers with the operating system of the client device 104 to receive data from other applications and/or client device 104 modules.

In determining whether the user 108 is using hyperarticulation in communicating the one or more queries and/or commands, the hyperarticulation detection server 106 is communicatively coupled to an unlabeled audio database 116 and a labeled audio database 118. The unlabeled audio database 116 includes user data and/or information obtained from the user 108 intended to be used as training date for the supervised machine learning algorithm instantiated by the hyperarticulation detection server 106. Similarly, the labeled audio database 118 includes labeled audio data where the labeled audio data is associated with varying degrees and/or types of hyperarticulation.

To obtain the labeled audio data from the unlabeled audio data, the hyperarticulation detection server 106 may employ a crowdsourcing tool to distribute the unlabeled audio data to one or more human operators 118 to indicate whether hyperarticulation is present in the unlabeled audio data. The hyperarticulation detection server 106 may communicate with the one or more human operators 118 via a network 112, which may include an ad hoc network, an intranet, an extranet, a VPN, a LAN, a WLAN, a WAN, a wireless WAN WWAN, a MAN, a portion of the Internet, a portion of the PSTN, a cellular telephone network, a wireless network, a Wi-Fi® network, a WiMax network, another type of network, or a combination of two or more such networks. One example of a crowdsourcing tool that the hyperarticulation detection server 106 may use is the Amazon Mechanical Turk*, which is available and accessible via the Internet.

The audio data is sampled from one or more speech recognition systems implemented on one or more mobile and desktop devices (e.g., from one or more client devices 104), and then labeled by the human operators 118 according to strict guidelines where consensus is sought. In collecting the audio data samples, the audio data providers (e.g., users) may be presented with an opportunity to participate or to opt-out of the audio data collection process. In addition, the hyperarticulation detection server 106 anonymizes the audio data samples such that no individually identifying information was collected with the sampled audio data. Thus, the provided sampled audio data merely included the audio data of the speech query authorized by the user to be collected. Using this anonymization process, approximately around 5000 speech query pairs were collected from user sessions while the user was naturally interacting with the personal digital assistant. A speech query pair may include first audio query and/or command and a second audio query and/or command, where the second audio query and/or command is similar to the first query and/or command.

To determine whether a given set of speech queries involved hyperarticulation, the following conditions were applied to increase the coverage of the signal of hyperarticulation. In one embodiment, the conditions may exclude query pairs that are not direct repetitions or significant reformulations. The conditions may include, but are not limited to:

(1) The time difference between the two queries was less than a predetermined threshold amount of time (e.g., less than or equal to two minutes);

(2) The two queries are phonetically similar. The disclosed embodiments may use one or more ways to identify whether two queries are phonetically similar:

(a) Metaphone edit distance <2: Levenshtein edit distance is measured after converting both the query texts to metaphones;

(b) Phonetic edit distance <2: PD=latticeDist(L1, L2) is the distance between phonetic lattices L1 and L2. $L_i$=g2p(query$_i$) where query$_i$s are word sequences and $L_i$s are phonetic lattices. In one embodiment, the g2p( ) function is a weighted finite state transducer that accepts grapheme(letter) sequences and produces a weighted lattice of phonemes. Paths through this lattice are possible pronunciations of the input letter sequence. The function g2p( ) may be trained on (grapheme sequence, phoneme sequence) pairs; and (c) Second query's 1-best recognition result was one of the candidates in the N-best hypotheses of the first query's recognition.

Using this formulation, the unlabeled audio data included the various query pairs without an identification of whether the second query of the query pair exhibited hyperarticulation. To obtain the labeled audio data, one or more of the human operators 118 were presented with audio for every query pair followed by questions. As discussed above, the audio presented to the one or more human operators 118 did not include individually identifiable information nor was such information collected with the obtained audio.

The human operators 118 were asked to answer whether or not both queries were trying to achieve the same task. This was asked to ensure that the second query is a second attempt of the first query. The one or more human operators 118 were then asked to compare what they heard in the second query to what they heard in the first query. The one or more human operators 118 were asked to look for acoustic cues of hyperarticulation in any part of the first query compared to the second query, vice versa, or whether there was no difference. This was done to ensure bidirectionality, e.g., the first query compared to the second and the second compared to the first, and to avoid biasing the human operators 118 to any one particular direction. This was done through a simple three choice question.

In evaluating each query pair, a predetermined number of human operators 118 (e.g., three to five human operators 118) was used to judge a given query pair. An attempt was made to reach a consensus of a predetermined number of human operators 118 (e.g., at least three judges). Where the predetermined number of human operators 118 was not reached in the consensus, the given query pair was not considered in training the hyperarticulation model used by a machine learning algorithm.

In one embodiment, a kappa value for inter-annotator agreement was computed as disclosed in Joseph L Fleiss, "Measuring nominal scale agreement among many raters," Psychological bulletin, vol. 76, no. 5, pp. 378, 1971 ("Fleiss"), which is incorporated by reference herein in its entirety. In empirical experimentation, Fleiss' kappa acquired a value of 0.82 when the human operators 118 checked if the second query was related to the first query. In some part, this is due to a biased data selection towards related queries. However, judging if there is hyperarticulation in the second query was observed as not being easy and the human operators 118 had a low kappa value of 0.38. To overcome the low kappa value, the disclosed language models (e.g., the hyperarticulation model) was trained using data with a consensus having reached a predetermined number of human operators 118 (e.g., at least three human operators 118).

The hyperarticulation detection server 106 then uses the labeled audio data to determine whether hyperarticulation is present in a second query of a query pair. Using another or similarly configured supervised machine learning algorithm, the hyperarticulation detection server 106 may also determine candidate hypotheses of the provided queries and/or commands. Although not germane to this disclosure, one of ordinary skill in the art will appreciate that the candidate hypotheses may be determined similarly (e.g., via labeled and/or unlabeled user data and a supervised machine learning algorithm). The estimates representing the user query and/or command, along with a determination of whether hyperarticulation is present, are then communicated to the client device 104. As discussed below with reference to FIG. 2, the client device 104 and/or the hyperarticulation detection server 106 may engage in additional processing of the estimates using the determination of whether hyperarticulation is present to select, determine, and/or generate a better representation of the provided user query and/or command. The client device 104 may then perform one or more operations, via a personal digital assistant, based on the candidate hypothesis communicated by the hyperarticulation detection server 106. Examples of operations include, but are not limited to, making a phone call, searching for content on the Internet, performing a file system- or operating-system related task, or other such operations or combinations thereof.

Figure 2:
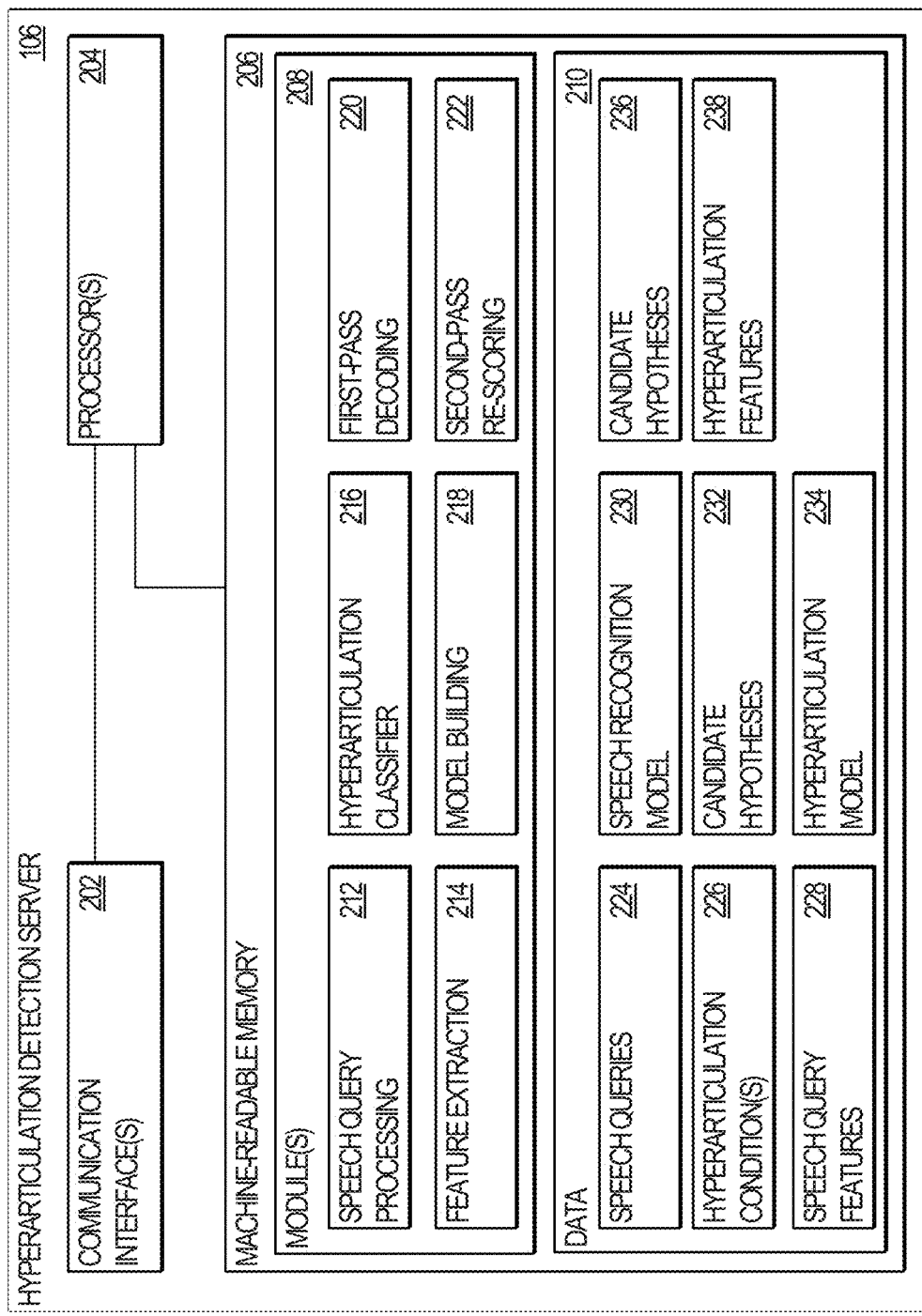
FIG. 2 is a block diagram of the server in FIG. 1, according to an example embodiment, configured to perform hyperarticulation detection and classification.

FIG. 2 is a block diagram of the hyperarticulation detection server 106 in FIG. 1, according to an example embodiment, configured to perform hyperarticulation detection and classification. In one embodiment, the emotional determination server 106 includes one or more processors 204, one or more communication interface(s) 202, and a machine-readable memory 206.

The various functional components of the hyperarticulation detection server 106 may reside on a single computer, or they may be distributed across several computers in various arrangements. The various components of the hyperarticulation detection server 106 may, furthermore, access one or more databases, and each of the various components of the hyperarticulation detection server 106 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Furthermore, the one or more processors 204 may be of any combination of processors, such as processors arranged to perform distributed computing. In one embodiment, the one or more processors 204 are implemented as hardware processors. In another embodiment, the one or more processors 204 are implemented as software processors.

The one or more communication interface(s) 202 may be configured to send and/or receive communications with the client device 104, the unlabeled audio database 114, and/or the labeled audio database 116. In this regard, the one or more communication interface(s) 202 may be a wired interface, such as an Ethernet interface, a wireless interface, such as an 802.11g/n interface, or a combination of wired and wireless interfaces.

The machine-readable memory 206 includes various modules 208 and data 210 for implementing the features of the hyperarticulation detection server 106. The machine-readable memory 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 208 and the data 210. Accordingly, the machine-readable memory 206 may be implemented as a single storage apparatus or device, or, alternatively and/or additionally, as "cloud-based" storage systems or storage networks that include multiple storage apparatus or devices.

The module(s) 208 may include one or more applications and/or modules 212-222. As is understood by skilled artisans in the relevant computer and Internet-related arts, each of the components 212-222 (e.g., a module, engine, and/or application) may represent a set of executable software instructions and the corresponding hardware (e.g., memory and processor) for executing the instructions. In one embodiment, the module(s) 208 include a speech query processing module 212, a feature extraction module 214, a hyperarticulation classifier 216, a model building module 218, a first-pass decoding module 220, and a second-pass re-scoring module 222. In one embodiment, the modules 208 are written in a computer-programming and/or scripting language. Examples of such languages include, but are not limited to, C, C++, C#, Java, JavaScript, Perl, Python, Ruby, or any other computer programming and/or scripting language now known or later developed.

The module(s) 208 may interact with data 210 stored in the machine-readable memory 206, such as one or more speech queries 224, one or more hyperarticulation condition(s) 226, one or more speech query features 228, a speech recognition model 230, a first set of candidate hypothesis 232, a hyperarticulation model 234, and a second set of candidate hypotheses 236. The various modules 308 and data 310 are discussed below.

The speech query processing module 212 is configured to process the queries and/or commands communicated by the client device 104 to the hyperarticulation detection server 106. The speech query processing module 212 may expose an application programming interface (API) that the client device 104 accesses to provide the one or more queries and/or commands to the hyperarticulation detection server 106. Furthermore, the speech query processing module 212 instantiates and/or executes one or more of the other modules (e.g., modules 214-222) in processing the received speech queries and/or commands. The speech query processing module 212 may further store the received speech queries and/or commands as the speech queries 224. As discussed above, the speech queries may include a pair of speech queries communicated by the client device 104. Additionally, and/or alternatively, the speech queries 224 include individually stored speech queries that the hyperarticulation detection server 106 then determines whether the individually stored speech queries are to be grouped into pairs.

In determining whether one or more queries and/or commands are to be further analyzed for hyperarticulation, the speech query processing module 212 may determine whether one or more of the speech queries 224 satisfy one or more hyperarticulation condition(s) 226. As explained above, the one or more hyperarticulation condition(s) 226 may include that one or more speech queries 224 satisfy a predetermined threshold time difference and that one or more speech queries 224 are phonetically similar. As also explained previously, determining whether one or more speech queries 224 are phonetically similar may include computing metaphone edit distances, phonetic edit distances, and whether the second query of the pair being analyzed was one of the candidates in the N-best hypotheses for the first query of the pair.

Where the hyperarticulation condition(s) 226 are satisfied and the hyperarticulation detection server 106 determines that a pairwise set of queries and/or commands are to be analyzed for hyperarticulation, one or more features may be extracted from each query and/or command of the pairwise set. Accordingly, the hyperarticulation detection server 106 includes a feature extraction module 214 that extracts one or more speech query features 228 from each received query and/or command. Additionally, and/or alternatively, the feature extraction module 214 may perform the feature extraction for each received speech query 224 prior to the application of the hyperarticulation condition(s) 226. The technical benefit of the feature extraction module 214 to help identify changes in the articulation from the first utterance to the next one of a given speech query and/or command.

In one embodiment, and for each utterance, the feature extraction module 214 extracts features from a received speech query 224 described in Table 1. One extracted speech query feature includes the frequency of the voice fundamental ($F_0$) for a given speech query. The feature extraction module 214 may obtain a minimum and maximum for each $F_0$ of the speech queries 224 using the implementation disclosed in David Talkin, "A robust algorithm for pitch tracking (rapt)," Speech coding and synthesis, vol. 495, pp. 518, 1995, which is incorporated by reference herein in its entirety. The ranges of the $F_0$ values may be from 50-500 Hz. The feature extraction module 214 may also determine a loudness value for each speech query, which may be an energy estimate derived from log-Mel features. These features may be further calculated for frames of 100 ms with a step of 10 ms. Those features may then be averaged over one or more word-segments, and each segment's average value may be retained for a corresponding feature. The time segmentation information is computed using a forced-alignment technique of the audio to the speech recognition hypothesis. The duration of each word-segment is added to the segment level features to make a total of 17 features per segment.

TABLE 1

Features computed for each segment of speech

| Features Group | Description | Dimension |
| --- | --- | --- |
| Prosodic | F0. Loudness. Pitch acceleration | 3 |
| Spectral | Log filter-bank energies | 12 |
| Time | Duration | 1 |
| Total | — | 17 |

In one embodiment, the hyperarticulation detection server 106 uses dynamic programming to align the segments of the query pairs based on lexical and time information from the word-segments in the hypotheses for the two utterances. This helps comparing the articulation differences on a word-by-word (e.g., segment-by-segment) basis. For each of the aligned segments, the hyperarticulation detection server 106 computes the deltas of the pre-computed segment-level average features and the deltas between the duration of the aligned segments. In addition, these deltas are then grouped into positive values and negative values for a given utterance pair. Out of both the groups and the overall set, one or more particular values are selected including, but not limited to, the minimum value, the maximum value, the average value, and one or more ratios for all the deltas. In this context, a ratio is the number of positive values or negative values over the total number of aligned segments. Table 2 summarizes these functional features.

TABLE 2

Functional acoustic features computed for each utterance

| Functional Layer | Description | Dimension |
| --- | --- | --- |
| 1 | Average of word-segments features | 17 |
| 2 | Deltas over aligned segments | 17 × # of segments |
| 3A | Min, Max, Ave, Ratio of positive deltas | 4 × 17 |
| 3B | Min, Max, Ave, Ratio of negative deltas | 4 × 17 |
| 3C | Min, Max, Ave over all deltas | 3 × 17 |
| 3 | Total | 187 |

The features determined by the feature extraction module 214 are then stored as the speech query features 228.

The model building module 218 is configured to construct one or more models used by the hyperarticulation detection server 106 in formulating initial estimates (e.g., hypotheses) that represent one or more of the speech queries 224 and for determining the probability that the second speech query of a speech query pair includes hyperarticulation. In one embodiment, the speech recognition model 230 and/or the hyperarticulation model 234 are implemented as a supervised machine learning algorithm, where the speech recognition model 230 and the hyperarticulation model 234 are developed using labeled audio data. The speech recognition model 230 is trained to formulate a first set of candidate hypotheses 232 (e.g., a first set of estimates) of a user query. The hyperarticulation model 234 is configured to determine the probability that a second query of a query pair includes hyperarticulation. As discussed below, these hyperarticulation features output by the hyperarticulation model 234 are then integrated with standard response determination features to formulate a second set of candidate hypotheses 236. Examples of machine learning algorithms that may be implemented by the speech recognition model 230 and/or the hyperarticulation model 234 include, but are not limited to, support vector machine (SVM), a Bayesian classifier (naïve or otherwise), a k-nearest neighbor classifier, or any other such supervised machine learning implementation or combination thereof. One example of a machine learning-based model that may be implemented is discussed in Prakash et al., "Emulating Human Conversations using Convolutional Neural Network-based IR," Neu-IR'16 SIGIR Workshop on Neural Information Retrieval, 2016 ("Prakash"), the disclosure of which is hereby incorporated by reference in its entirety. As explained previously, the model building module 218 may be configured to train the speech recognition model 230 and/or the hyperarticulation model 234 via the one or more human operators 118 using one or more speech queries and/or pairwise speech queries stored in the unlabeled audio database 114 and/or the labeled audio database 116.

The hyperarticulation detection server may leverage a predetermined number of utterance pairs (e.g., a first speech query and a second speech query) in training the speech recognition model 230 and/or the hyperarticulation model 234. In one embodiment, 3000 annotated utterance pairs are used for training and 660 utterance pairs are used for testing. In addition, one or more negative examples may be down-sampled to have balanced priors in both training and test data.

In training the models 230,234, one or more classification techniques may be used, such as gradient boosted decision tree binary classification. In some implementations, decision trees may be used as classifiers since decision trees may be easier to visualize and integrate into practical solutions. One or more parameters may be optimized separately for each feature group and then all the features together by varying the number of trees and iterations. In one embodiment, a decision tree is used having 100 trees and 100 iterations.

Table 3 shows the results on the different feature groups discussed above and their combinations. Performance was measured in terms of accuracy, positive precision, positive recall, negative precision, negative recall and area under the curve. Within feature groups, the results show that the highest accuracy and positive precision comes from the duration features. One theory for this result is that users tend to elongate the words as a way of emphasizing them.

TABLE 3

Hyperarticulation results in terms of Accuracy, Precision, Recall, and Area Under the Curve (AUC).

| Model | Accuracy | Pos. Precision | Pos. Recall | Neg. Precision | Neg. Recall | AUC |
| --- | --- | --- | --- | --- | --- | --- |
| Prosody | 55.4 | 55.5 | 57.3 | 55.4 | 53.5 | 57.2 |
| Spectral | 61.4 | 61.1 | 63.7 | 61.7 | 59.1 | 63.8 |
| Duration | 65.8 | 66.6 | 64.3 | 65.2 | 67.4 | 69.0 |
| Duration + Prosody + Spectral | 67.4 | 67.5 | 67.7 | 67.3 | 67.1 | 69.8 |

In one embodiment, the feature groups are combined to obtain a performance of 67.5% accuracy. While prosody and spectral features may be used by themselves, adding them to duration results in improved performance. The improved performance demonstrates how spectral and prosody features may impact the overall performance when there is not enough evidence in the duration features of hyperarticulation. As shown in Table 3, the duration feature showed the best performance in terms of negative recall.

To formulate an initial set of estimates (e.g., candidate hypotheses), the hyperarticulation detection server 106 includes a first-pass decoding module 220. The first-pass decoding module 220 is configured to invoke the speech recognition model 230 using a first speech query as input to determine a set of potential hypotheses for the first speech query. The estimates may include an attempted interpretation of the speech query that the user 108 intended. Furthermore, the hyperarticulation detection server 106 may be configured to formulate a predetermined number of candidate hypotheses (e.g., an N-best list, where N is greater than or equal to one) that represent the provided user query and/or command. A score for each estimate may be computed via the speech recognition model 230, and then the estimates may be ranked according to the determined score. In this context, the score may represent a probability that the estimate best represents, or most accurately reflects, the words and/or phrases in the provided user query and/or command. The highest ranked estimate (e.g., the 1-best candidate hypothesis) may then be communicated to the client device 104.

The user 108 may then reiterate the user query and/or command which, if one or more of the hyperarticulation condition(s) 226 are satisfied, represents a second query and/or command of the pairwise utterance, where the first query is selected as the first query of this pairwise utterance.

Figure 3A:
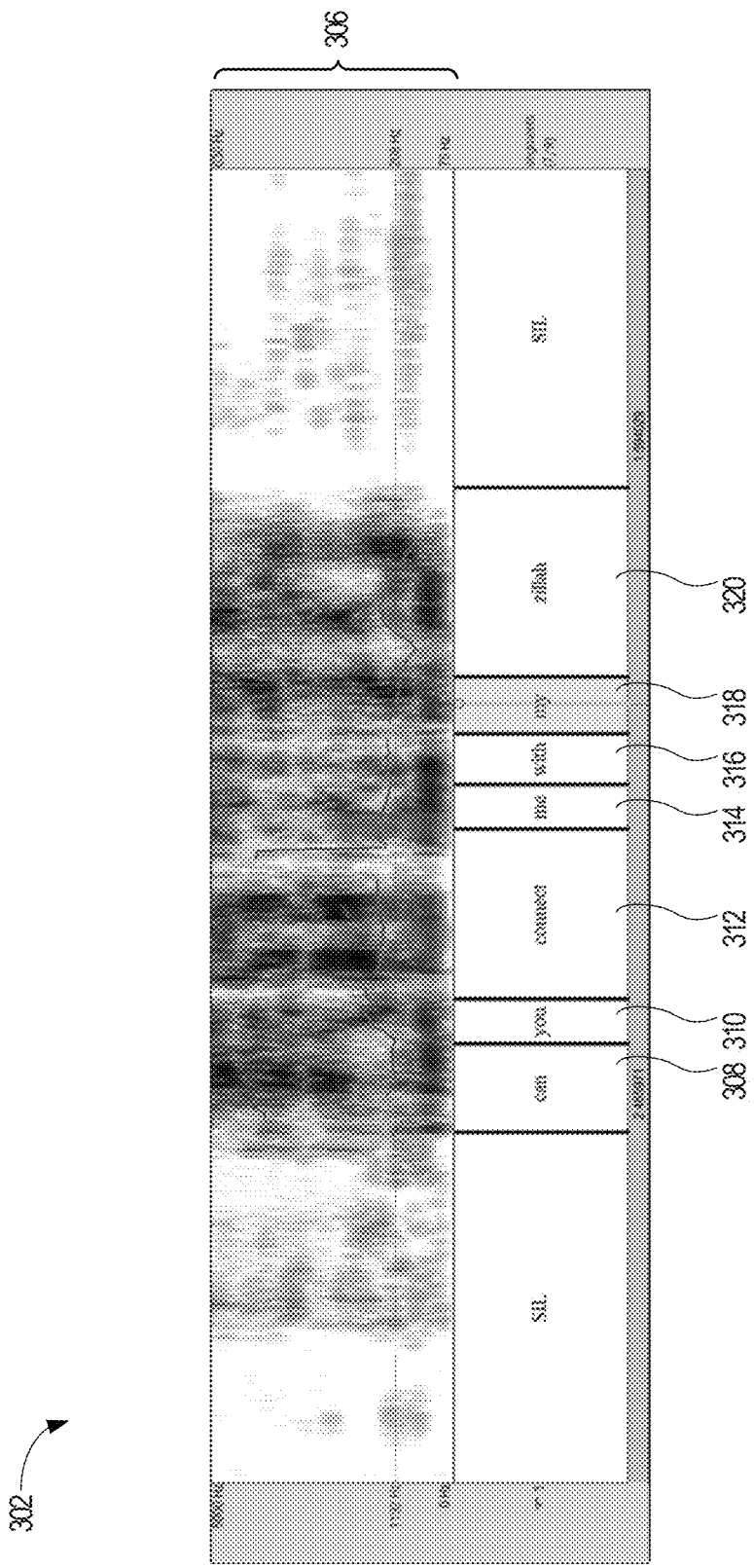
FIGS. 3A-3B are images of spectrograms from an utterance pair example for a query acquired by the client device of FIG. 1 in accordance with an example embodiment.
Figure 3B:
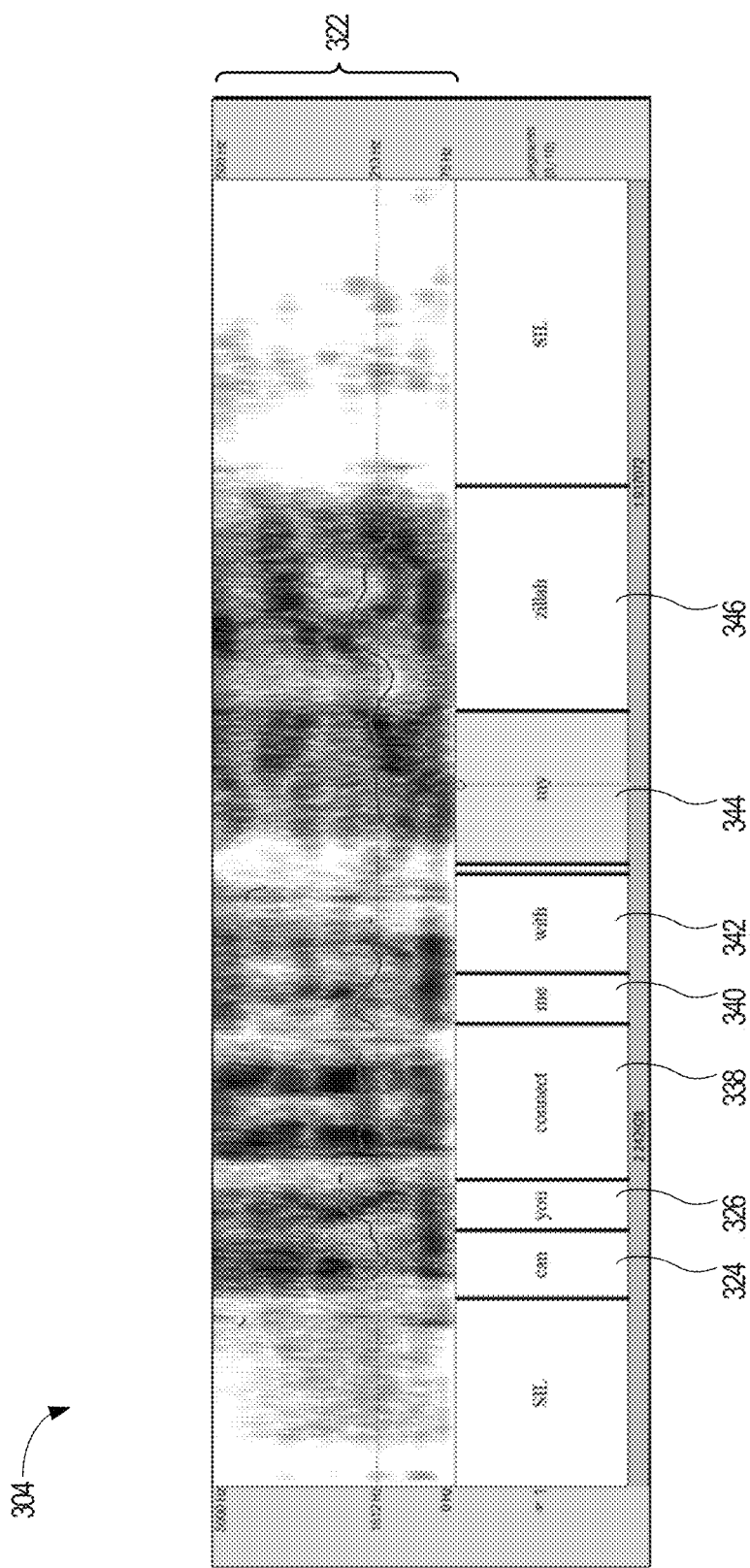

FIGS. 3A-3B are images of spectrograms 302-304 from an utterance pair example for the query "can you connect me with Mazilla?" The spectrograms 302-304 were created from utterances using Praat, which is disclosed by Paul Boersma et al., "Praat, a system for doing phonetics by computer," Glot international, vol. 5, no. 9/10, pp. 341-345, 2002, the disclosure of which is hereby incorporated by reference in its entirety. Referring initially to FIG. 3A, a top portion 306 shows the spectrogram 302 for a first utterance with various word segmentations 308-320. The first utterance has been processed by the first-pass decoding module 220, which has selected a candidate hypothesis having the word segmentations "can," "you," "connect," "me," "with," "my," and "zillah." FIG. 3A also shows the pitch frequency contours in the top portion 306, which is shown as a discontinuous, but curved line, extending horizontally through FIG. 3A. In the utterance shown in FIG. 3A, a user had intended the segmentations "my" and "zillah" to be a single segmentation, "Mazilla." The hyperarticulation detection server 106 may then communicate this candidate hypothesis to the client device 104.

FIG. 4B is an image of a spectrogram 304 where the user has provided a second utterance for the query "can you connect me with Mazilla?" The spectrogram 304 illustrates that the second utterance includes word segmentations 324-346. With the spectrogram 304, it is evident that the speaker is dissatisfied with the recognition and hypothesis proposed by the hyperarticulation detection server 106 for the first utterance. With the second utterance, the speaker repeats the same query, but has hyperarticulated the contact name "Mazilla" which was incorrectly recognized as "my zillah." Hyperarticulation is evident in the duration of the segments of that particular word (e.g., word segments 344 and 346) and also in the pitch frequency, which are longer and higher in the second utterance than in the first utterance respectively. In addition, in the second utterance, the speaker seems to pause for a short time before hyperarticulating the contact name as shown by the additional silence segment just before the hyperarticulation location, associated with word segment 344 of "my." The forced-alignment segmentation produces nine segments in the first utterance and ten segments in the second one. The word-segments align to each other in a straight forward fashion and functional features are computed over the aligned segments. Aligned segments that have SIL (silence) in them are discarded, whether it is silence-to-silence or silence-to-word alignment.

When examining the top features, it was found that the top features are mainly duration features which are later complemented with prosody and spectral features. It was found that the maximum and minimum functional features also have an emphasized role over other functional features. This shows that users generally stress a single part or portion of the utterance and not all of the utterance. This part of the utterance mainly contains the gist of the request or the hardest word to recognize; for example, the contact name "Mazilla" in FIGS. 3A-3B.

In the embodiments of intrinsic evaluations, which focus on hyperarticulation classification quality, one or more embodiments may also employ an extrinsic evaluation to show the usefulness of the hyperarticulation detection task in improving speech recognition overall. In some embodiments, the first-pass decoding module 220 and a second-pass re-scoring module 222 re-score and re-ranks one or more of the candidate hypotheses 232 using one or more additional signals as described in Milad Shokouhi, Umut Ozertem, and Nick Craswell, "Did you say u2 or youtube?: Inferring implicit transcripts from voice search logs," in *Proceedings of the 25th International Conference on World Wide Web*, International World Wide Web Conferences Steering Committee, 2016, pp. 1215-1224, which is incorporated by reference herein in its entirety.

In one embodiment, the second-pass re-scoring module 222 rescores and re-ranks the initially N-best candidate hypotheses 232 using the word error rate (WER) of each hypothesis as the ranking target. The second-pass re-scoring module 222 may be implemented as LambdaMART, which is disclosed in Qiang Wu, et al., "Adapting boosting for information retrieval measures," Information Retrieval, vol. 13, no. 3, pp. 254-270, 2010, the disclosure of which is hereby incorporated by reference in its entirety. As one of ordinary skill in the art would appreciate, the LambdaMART model is based on gradient boosted decision trees and considered among the strongest models for learning supervised rankers.

To set the parameters of LambdaMART, a parameter sweep is performed over a predetermined number of trees, a predetermined number of leaves per tree, a learning rate and the minimum number of instances per leaf. One of ordinary skill in the art would appreciate and understand how to optimize the LambdaMART model, such as that disclosed in Tomáš Tunys, "LambdaMART Demystified," Czech Technical University, Jan. 23, 2015, the disclosure of which is hereby incorporated by reference in its entirety.

The feature space of the second-pass re-scoring module 222 contains acoustic and language model scores from the first-pass decoder as well as language model scores computed over several additional corpora such as large scale web queries, as well as title, body and anchor text of web documents. These language models may be bigger than a single machine's memory or solid-state drive, and may be kept in a distributed key value store. Accordingly, such additional models may represent a more powerful model than the language model used in the first pass. In alternative embodiment, these language models may be implemented client-side on a user's device or other computing platform.

A hyperarticulation classifier 216 is configured to determine one or more hyperarticulation features 238 and corresponding probability values for such features using the trained hyperarticulation model 234. The hyperarticulation features 238 include a hyperarticulation probability that a given query includes hyperarticulation and a binary indication of whether the query was detected as having hyperarticulation. These features are communicated to the second-pass re-scoring module 222, which uses these additional features to re-score the candidate hypotheses 232 to obtain the re-scored candidate hypotheses 236.

In one embodiment, for every utterance in a given dataset, the previous utterance is fetched in the same session, if present. If a given utterance does not have a previous utterance within a predetermined time frame (e.g., 5 minutes), the second-pass re-scoring module 222 treats the hyperarticulation features as missing. This utterance pair is then passed through hyperarticulation classifier 216 to obtain the hyperarticulation classifier probability and the hyperarticulation label using the top hypothesis and replicate them for the N-best list. In one embodiment, a version of the classifier with all the feature groups may give the maximum gains in accuracy for the hyperarticulation detection task. Additionally, and/or alternatively, the distance metrics that were used as the sampling criteria may also be input into the feature space. Table 4 describes one or more features that are considered by the re-ranking/re-scoring methods. The feature listed as "NbestCandidateEqualsPrevQuery" captures information from previous query at the N-best candidate level.

TABLE 4

Additional features for rescoring/re-ranking.

| Feature Name | Description |
| --- | --- |
| Hyperarticulation Classifier Outputs | |
| HAClassiferProbability | Decision tree output probability. |
| HAClassifierOutput | Binary label as provided by the classifier. |
| Query Similarity Features | |
| Metaphone Similarity | Edit distance between metaphone representations |
| PhoneticSimilarity | Edit distance between phoneme lattices. |
| Q2inNbestQ1 | True, if the recognition result of a current query was in the N-best list of the previous query. |
| NbestCandidateEqualsPrevQuery | True, if the N-best candidate is the same as the previous query. |

Figure 4:
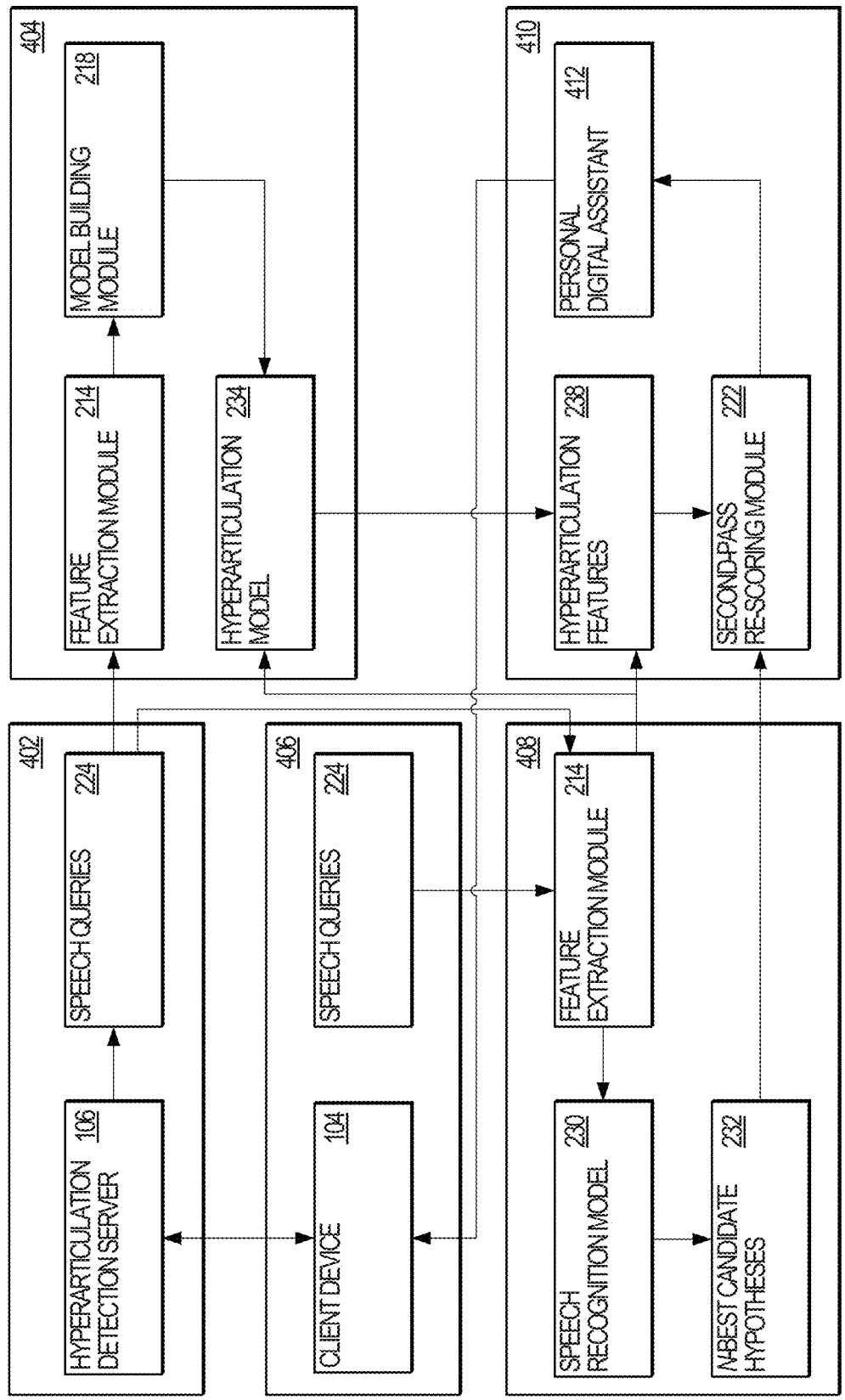
FIG. 4 illustrates an architecture diagram showing the interactions among various component groups of a client device and a hyperarticulation detection server of FIG. 1 in accordance with an example embodiment.

FIG. 4 illustrates an architecture diagram showing the interactions among various component groups 402-410 of the client device 104 and the hyperarticulation detection server 106 in accordance with an example embodiment. The groups 402-410 illustrate the manner in which various components interact in the client device 104 and the hyperarticulation detection server 106. FIG. 4 also illustrates the inputs and outputs that the various groups 402-410 consume and produce. FIG. 4 also includes the personal digital assistant 412, which communicates its output to the client device 104. As explained above, the personal digital assistant 412 may perform one or more tasks and/or operations of the client device 104.

Figure 5A:
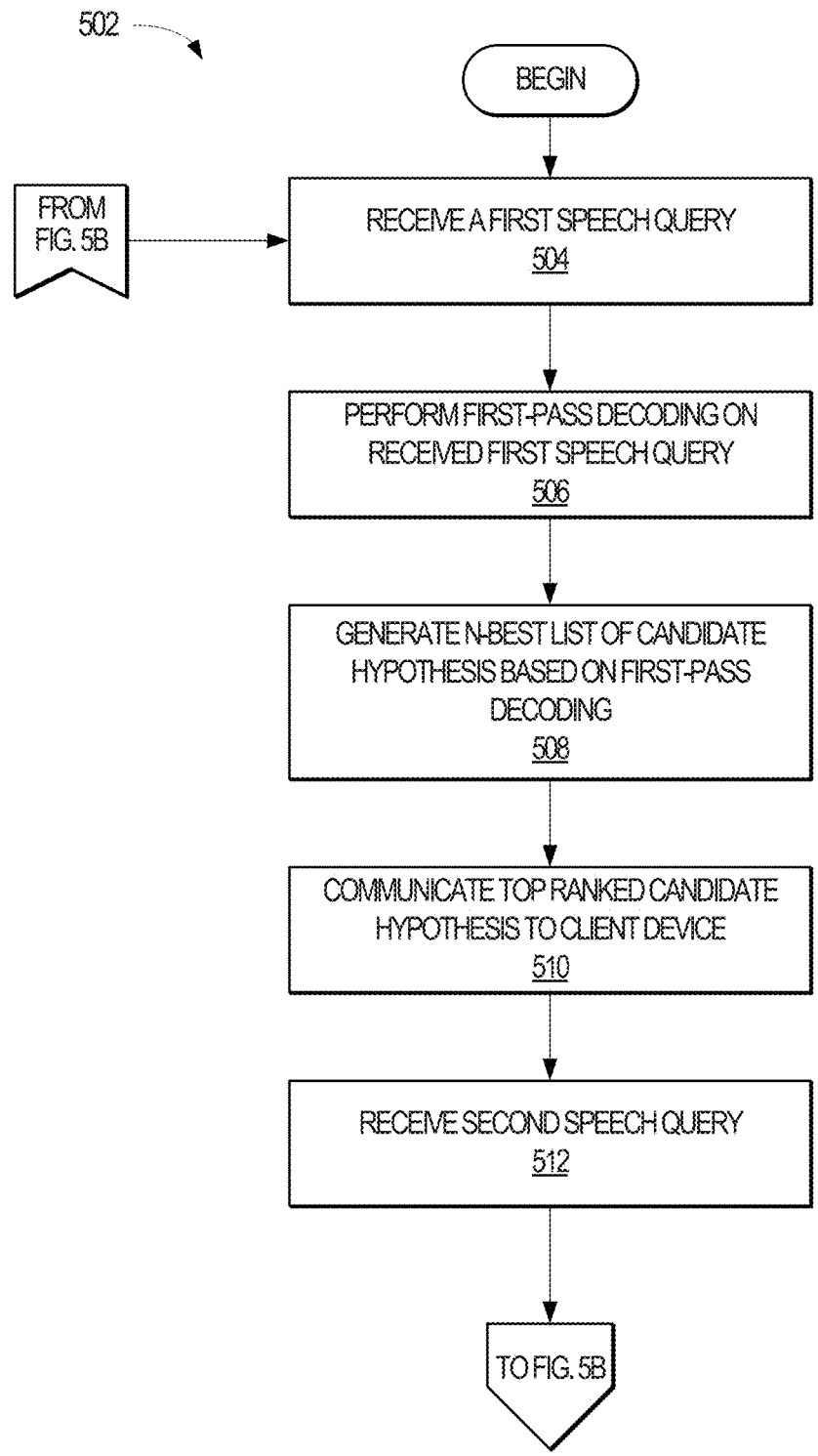
FIG. 5A-5C illustrate a method, in accordance with an example embodiment, for detecting hyperarticulation in a pair of speech utterances obtained via the client device of FIG. 1.
Figure 5B:
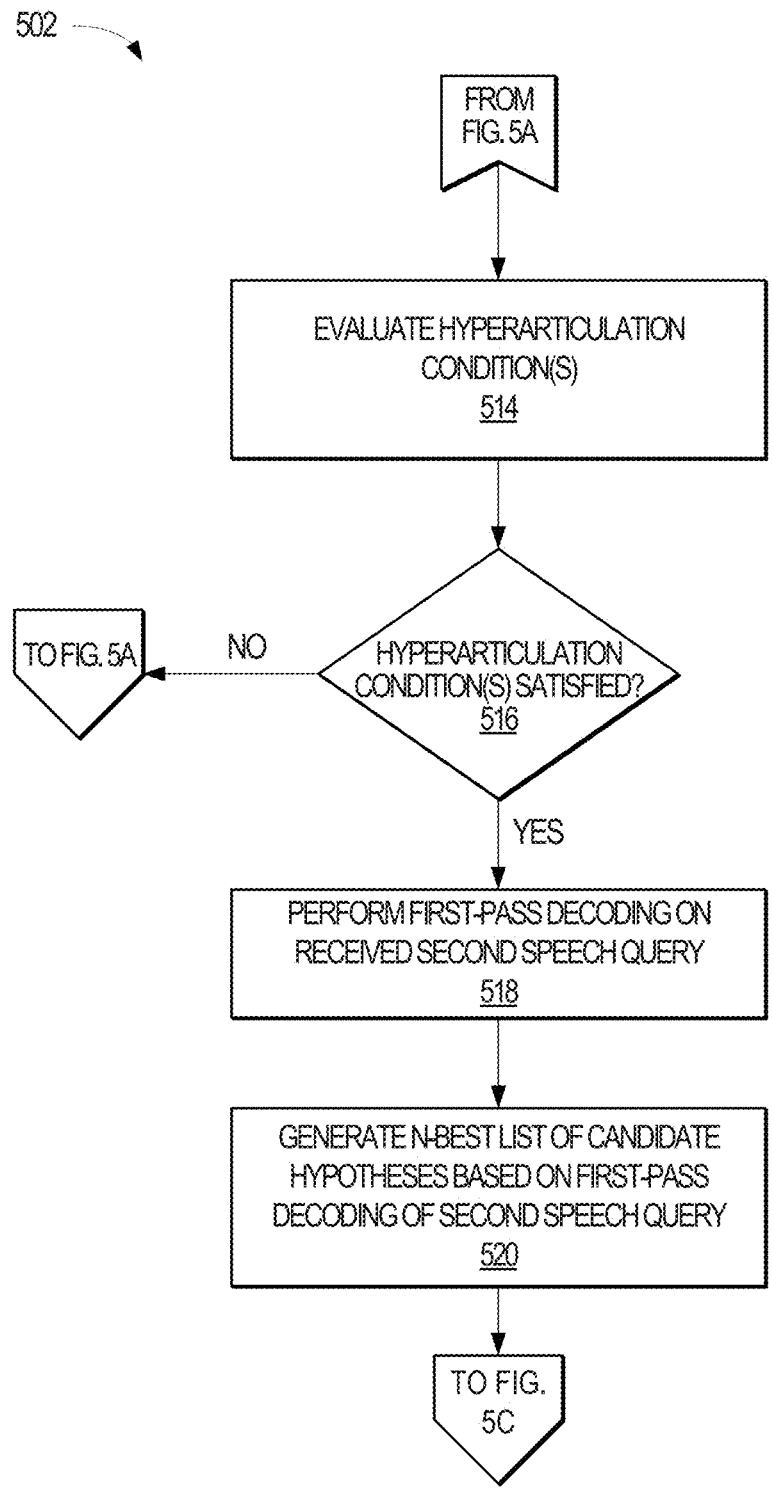
Figure 5C:
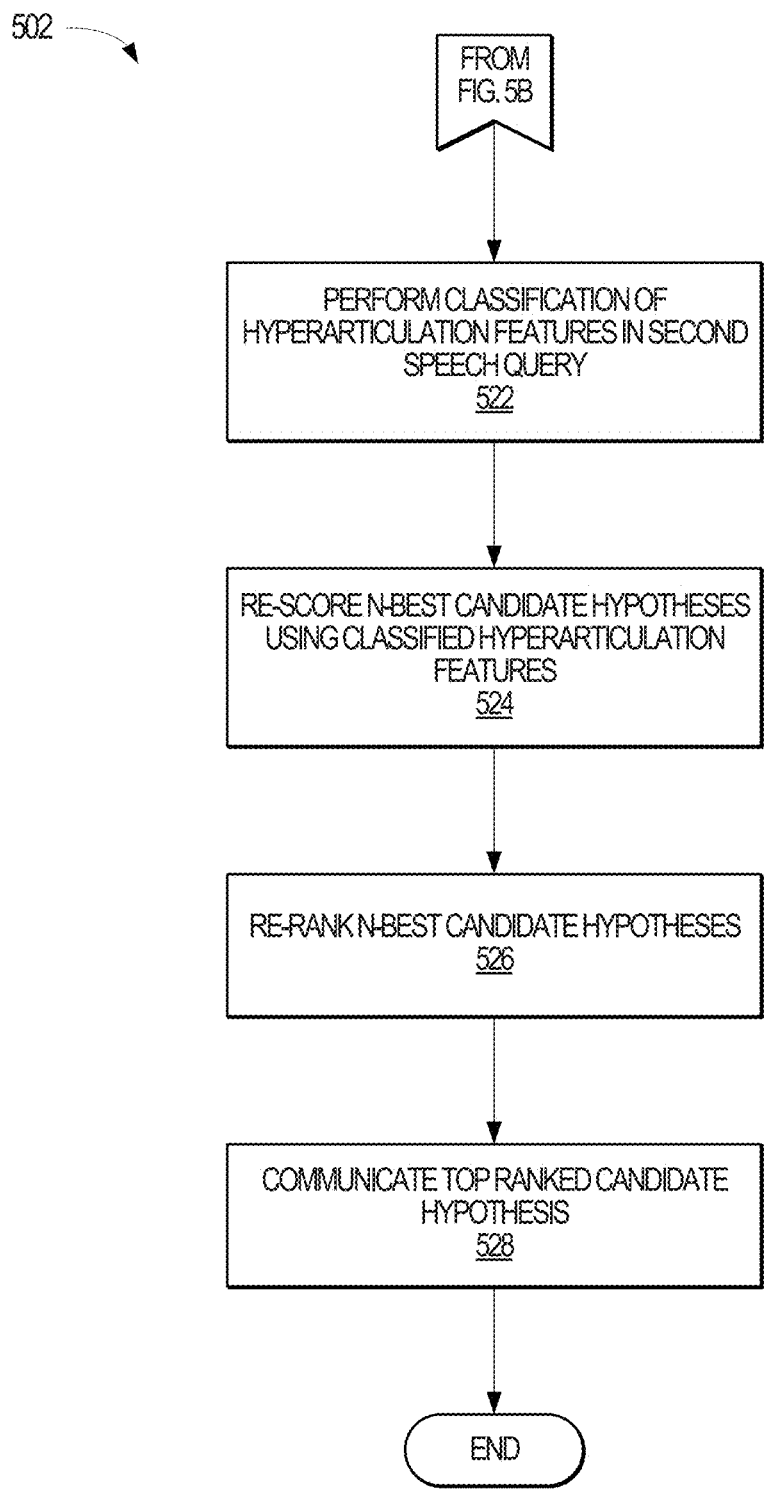

FIG. 5A-5C illustrate a method 502, in accordance with an example embodiment, for detecting hyperarticulation in a pair of speech utterances obtained via the client device of FIG. 1. The method 502 may be implemented by one or more components of the client device 104 and/or the hyperarticulation detection server 106, and is discussed by way of reference thereto.

Initially, and with reference to FIG. 5A, the hyperarticulation detection server 106 receives a first speech query (Operation 504). As explained above with reference to FIG. 1, the hyperarticulation detection server 106 may receive the first speech query from the client device 104.

The hyperarticulation detection server 106 then performs speech recognition on the first speech query. In one embodiment, this includes invoking the first-pass decoding module 220 to decode the first speech query (Operation 506). With reference to FIG. 2, the first-pass decoding module 220 may leverage the speech recognition model 230 to then generate an N-best list of candidate hypotheses of the received first speech query (Operation 508). In one embodiment, this N-best list of candidate hypotheses is stored as the candidate hypotheses 232. The hyperarticulation detection server 106 may then communicate the top ranked candidate hypothesis to the client device 104 (Operation 510). The client device 104, via a personal digital assistant, may communicate a message to the user that the first speech query was not understood. Where the first speech query is not understood by the client device 104, the user may provide, or be prompted to provide, a second speech query. Accordingly, the hyperarticulation detection server 106 then receives the second speech query (e.g., via the client device 104).

Referring to FIG. 5B, the hyperarticulation detection server 106 may then evaluate one or more hyperarticulation condition(s) 226 to determine whether the received second speech query is potentially a hyperarticulated version of the first speech query (Operation 514). The hyperarticulation detection server 106 then determines whether the hyperarticulation condition(s) were satisfied (Operation 516). Where this determination is made in the negative (e.g., the "NO" branch of Operation 516), the method 502 returns to Operation 504, which indicates that the second speech query was unlikely to be a hyperarticulated version of the first speech query. Alternatively, where this determination is made in the affirmative (e.g., the "YES" branch of Operation 516), the method 502 proceeds to Operation 518.

At Operation 518, the first-pass decoding module 220 processes the received second speech query. The first-pass decoding module 220 then generates an N-best list of candidate hypotheses from the second received speech query. Referring to FIG. 5C, the hyperarticulation classifier 216 then classifies one or more of the candidate hypotheses to obtain various hyperarticulation features 238 (Operation 522). Using the hyperarticulation features, along with one or more extracted speech query features 228, the second-pass re-scoring module 222 re-scores the one or more N-best candidate hypotheses to obtain the second set of candidate hypotheses 236 (Operation 524). The second set of candidate hypotheses are then re-ranked to obtain the top ranked candidate hypothesis that likely represents the second received speech query (Operation 526). The top re-ranked candidate hypothesis may then be communicated to the client device (Operation 528), where it may be displayed to the user 108 or used by the client device 104 to perform a particular task or operation associated with the received second speech query.

In an experimental environment, one or more second pass rescoring experiments were performed and various results were obtained. The data used for these experiments are human transcriptions of randomly sampled real user data from a voice-enabled personal assistant. As discussed above, such transcriptions did not include individually identifiable data nor was any personal information disclosed about a particular user. The size of the training set for the ranker was 70000 and the test set used was 4000 utterances. The coverage of the additional feature groups mentioned in Table 4 is 54%, which is the number of utterances in this dataset that had a preceding audio query in the same session.

Improvements were measured as a percentage word error rate reduction (WERR) relative to pre-rescoring WER. The result of adding different feature groups is described in Table 5. Over the standard feature set, improvements were noticed after adding the hyperarticulation probability and label given by the classifier. In the following three lines of Table 5, one will notice that there are additional improvements obtained by adding the sampling criteria as features. This indicates that the rescoring classifier learns that HAClassifierProbability is more reliable in instances that fit a given sampling criteria. In the last line of Table 5, one will notice that noticeable improvements were obtained by adding an N-best candidate level feature Nbest-CandidateEqualsPrevQuery, which in essence captures if the query is very similar to a previous recognition result, and intuitively allows the ranker to down-weight such candidates in the presence of hyperarticulation.

TABLE 5

Second pass rescoring experiment results. WERR is the relative WER reduction compared to the pre-rescoring WER.

| Feature Set | WERR (%) |
| --- | --- |
| Standard Features | 9.82 |
| +Hyperarticulation classifier output | 10.33 |
| +Query similarity features | 10.53 |
| +NbestCandidateEqualsPrevQuery | 10.77 |

Upon observation, it was noticed that if the dataset includes only those cases having a preceding audio query in the same session, a WERR of 11.43% is obtained with all the features. The remaining part of the dataset, which does not have a preceding audio query in the same session, has a WERR of 10.14%. These differences show that the disclosed systems and methods provide a technical benefit and improvement over prior implementations that did not use a preceding audio query in determining the task associated with the audio query. These technical benefits further translate into improvements into other technical fields, such as human/machine interfaces, In this manner, this disclosure describes how hyperarticulation detection provides a useful signal that improves automatic speech recognition, specifically through a second pass rescoring. The results disclosed herein show that aligning and computing segment deltas for prosodic, spectral, and duration features facilitate the hyperarticulation detection task. Using hyperarticulation, along with one or more auxiliary features, results in further word error rate reduction in a speech recognition rescoring experiment on real user data.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 6:
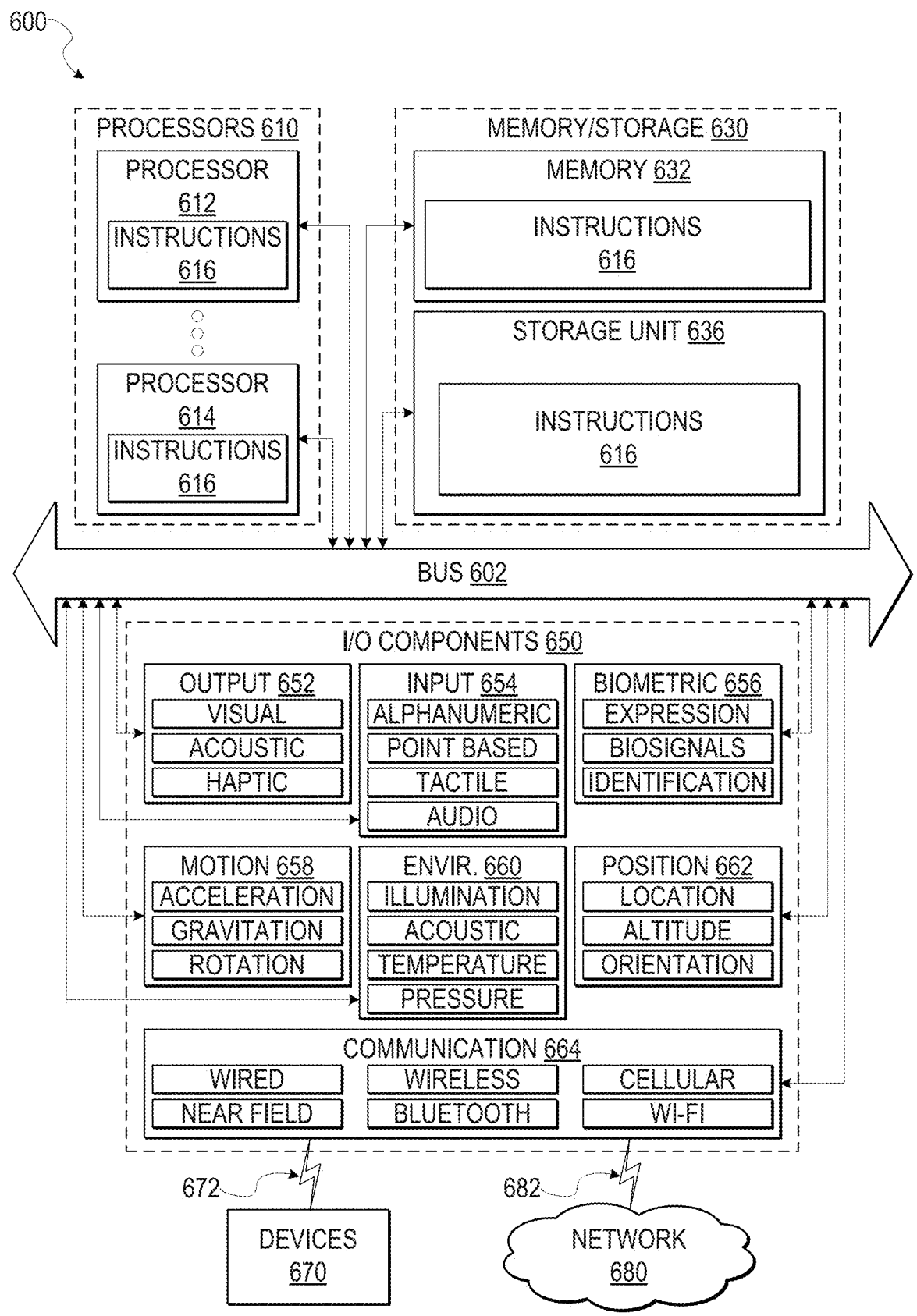
FIG. 6 is a diagrammatic representation of a machine in the example form of a computer system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 602 illustrated in 5A-5C. Additionally, or alternatively, the instructions 616 may implement one or more of the modules 208 illustrated in FIG. 2. The instructions 616 transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include a multi-core processor that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system for detecting hyperarticulation in repetitive voice queries, the system comprising:
a computer-readable memory storing computer-executable instructions, and a hardware processor in communication with the computer-readable memory that, having executed the computer-executable instructions, configure the system to:
determine a plurality of hyperarticulation features for a first audio utterance using a trained machine learning hyperarticulation model, wherein at least one hyperarticulation feature comprises a probability that a portion of the first audio utterance includes hyperarticulation;
determine a first plurality of candidate hypotheses corresponding to the first audio utterance using a speech recognition module;
rank the first plurality of candidate hypotheses based on the determined plurality of hyperarticulation features; and
selecting a hypothesis from a set of hypotheses comprising the first plurality of candidate hypotheses based on the rank associated with the hypothesis selected.

2. The system of claim 1, wherein the first audio utterance is further determined to include hyperarticulation where they first audio utterance was received within a predetermined time interval from a time when a second audio utterance was received.

3. The system of claim 1, wherein the system is further configured to:
determine the probability that a portion of the first audio utterance includes hyperarticulation based on a comparison of the first audio utterance with a second audio utterance.

4. The system of claim 3, wherein the comparison of the first audio utterance with the second audio utterance comprises determining a phonetic similarity between the first audio utterance and the second audio utterance.

5. The system of claim 3, wherein the system is further configured to:
determine a second plurality of candidate hypotheses corresponding to the second audio utterance; and
the comparison of the first audio utterance with the second audio utterance includes determining whether a particular hypothesis from the first plurality of candidate hypotheses is included in the second plurality of candidate hypotheses.

6. The system of claim 3, wherein the system is further configured to:
score each of the candidate hypotheses of the first plurality of candidate hypotheses based on a metaphone similarity between the first audio utterance and the second audio utterance and a phonetics similarity between the first audio utterance and the second audio utterance.

7. The system of claim 3, wherein:
the first audio utterance comprises a first plurality of word segments;
the second audio utterance comprises a second plurality of word segments; and
the system is further configured to align the first plurality of word segments with the second plurality of word segments.

8. The system of claim 3, wherein:
the first audio utterance comprises a first plurality of word segments;
the second audio utterance comprises a second plurality of word segments; and
the system is further configured to determine that the first audio utterance is likely to include hyperarticulation where at least one word segments is longer in duration than a corresponding word segment of the second plurality of word segments.

9. A method for detecting hyperarticulation in repetitive voice queries, the method comprising:
determining a plurality of hyperarticulation features for a first audio utterance using a trained machine learning hyperarticulation model, wherein at least one hyperarticulation feature comprises a probability that a portion of the first audio utterance includes hyperarticulation;
determining a first plurality of candidate hypotheses corresponding to the first audio utterance using a speech recognition module;
ranking the first plurality of candidate hypotheses based on the determined plurality of hyperarticulation features; and
selecting a hypothesis from a set of hypotheses comprising the first plurality of candidate hypotheses based on the rank associated with the hypothesis selected.

10. The method of claim 9, further comprising:
determining that the first audio utterance included hyperarticulation based on a determination that the first audio utterance was received within a predetermined time interval from a time when a second audio utterance was received.

11. The method of claim 10, wherein determining the probability that a portion of the first audio utterance includes hyperarticulation is based on a comparison of the first audio utterance with the second audio utterance.

12. The method of claim 11, wherein the comparison of the first audio utterance with the second audio utterance comprises determining a phonetic similarity between the first audio utterance and the second audio utterance.

13. The method of claim 11, further comprising:
determining a second plurality of candidate hypotheses corresponding to the second audio utterance; and
comparing the first audio utterance with the second audio utterance includes determining whether a particular hypothesis from the first plurality of hypotheses is included in the second plurality of hypotheses.

14. The method of claim 11, further comprising:
scoring each of the candidate hypotheses of the first plurality of candidate hypotheses based on a metaphone similarity between the first audio utterance and the second audio utterance and a phonetics similarity between the first audio utterance and the second audio utterance.

15. The method of claim 11, wherein:
the first audio utterance comprises a first plurality of word segments;
the second audio utterance comprises a second plurality of word segments; and
the method further comprises aligning the first plurality of word segments with the second plurality of word segments.

16. The method of claim 11, wherein:
- the first audio utterance comprises a first plurality of word segments;
- the second audio utterance comprises a second plurality of word segments; and
- the method further comprises determining that the first audio utterance is likely to include hyperarticulation where at least one word segment of the first plurality of word segments is longer in duration than a corresponding word segment of the second plurality of word segments.

17. A machine-readable memory having computer-executable instructions stored thereon that, when executed by a hardware processor, causes a system to perform a plurality of operations comprising:
- determining a plurality of hyperarticulation features for a first audio utterance using a trained machine learning hyperarticulation model, wherein at least one hyperarticulation feature comprises a probability that a portion of the first audio utterance includes hyperarticulation;
- determining a first plurality of candidate hypotheses corresponding to the first audio utterance using a speech recognition module;
- ranking the first plurality of candidate hypotheses based on the determined plurality of hyperarticulation features; and
- selecting a hypothesis from a set of hypotheses comprising the first plurality of candidate hypotheses based on the rank associated with the hypothesis selected.

18. The machine-readable memory of claim 17, wherein the plurality of operations further comprises:
- determining that the first audio utterance includes hyperarticulation based on determination that the first audio utterance was received with a predetermined time interval from a time when a second audio utterance was received.

19. The machine-readable memory of claim 17, wherein determining the probability that a portion of the first audio utterance includes hyperarticulation is based on a comparison of the first audio utterance with a second audio utterance.

20. The machine-readable memory of claim 19, wherein the comparison of the first audio utterance with the second audio utterance comprises determining a phonetic similarity between the first audio utterance and the second audio utterance.

* * * * *